UNITED STATES PATENT OFFICE.

ISIDOR KITSEE, OF PHILADELPHIA, PENNSYLVANIA, ASSIGNOR TO DYE PRODUCTS COMPANY OF THE UNITED STATES, OF PHILADELPHIA, PENNSYLVANIA, A CORPORATION OF DELAWARE.

PURIFYING LOGWOOD DYES.

1,210,948.

Specification of Letters Patent. Patented Jan. 2, 1917.

No Drawing. Application filed November 5, 1915. Serial No. 59,759.

*To all whom it may concern:*

Be it known that I, ISIDOR KITSEE, a citizen of the United States, residing at Philadelphia, county of Philadelphia, and State of Pennsylvania, have invented a new and useful Improvement in Purifying Logwood Dyes, of which the following is a full, clear, and exact description.

My invention relates to the treatment of vegetable dyes, such as logwood dyes.

The object of my invention is to purify such dyes. It is well known that dyes of the vegetable character, such as logwood dyes, carry with it all or most of the impurities of the natural wood, such as rosin or resins, tannins and earthy matter. Such impurities greatly retard dyeing with the extract from such wood, and it is the aim of my invention to produce a dye of vegetable origin free from these contaminations.

It is well known to persons versed in the art that to-day the dyeing with logwood or similar vegetable colors is carried on with the aid of comparatively high temperature, and it is conceded by persons versed in the art that the dyeing with logwood and like material is impractical "in cold". I have found by experiments that the impurities, such as rosin or resins and like impurities, prevent this dyeing "in cold" and that if these impurities are removed the dyeing without the raise of temperature is practical and with the raise of temperature is quicker and better accomplished than is now the case.

I am well aware that extracts of logwood or like products may be purified in the usual manner by extracting, through a series of chemical processes, one impurity after the other, but such procedure requires a great length of time and is prohibitive in commercial practice on account of the great cost involved.

In my endeavor to purify logwood and like products, so that the same may be used "in cold" as well as with raised temperature as dyes, I had recourse to a great many expedients and chemicals, but I have found that if a slight amount of sulfurous acid ($H_2SO_3$) is added to the logwood extract or solution, the impurities are automatically discharged from the solution and settle at the bottom of the receptacle in which the solution is contained, to such a degree as to produce a practically pure dye, free from rosin or resins and like products.

In the case of my experiments I have found that an addition of from 1 to 10% by weight of the acid to the dye will purify the same to the required practical degree. I have also found that it is possible to use, instead of liquid sulfurous acid, the gaseous product itself, but in practice it is far easier and nearly as economical to use the sulfurous acid of commerce and I therefore prefer the same.

The invention has been found applicable to certain vegetable dyes other than logwood dyes, and I therefore desire it to be understood that in claiming the application of the process to logwood dyes, I mean to include, as equivalents of logwood dyes, any other vegetable dyes to which the process is applicable.

Having now fully described my invention, what I claim and desire to protect by Letters Patent is:

1. The method of purifying logwood dyes, which consists in subjecting such dyes to the chemical action of a sulfur oxid.

2. In the treatment of logwood dyes, the improvement which consists in subjecting a suitable logwood dye to the action of a sulfurous acid.

3. As a new article of manufacture, a logwood dye consisting of the dye proper and an oxid of sulfur.

4. As a new article of manufacture, a logwood dye combined with a slight amount of sulfurous acid.

In testimony of which invention I have hereunto set my hand, at Philadelphia, on this 3rd day of November, 1915.

ISIDOR KITSEE.

Witnesses:
FRANCES RUTHERFORD,
ALVAH RITTENHOUSE.